(12) United States Patent
Jones et al.

(10) Patent No.: US 12,423,737 B2
(45) Date of Patent: Sep. 23, 2025

(54) SYSTEM, METHOD, AND MACHINE-READABLE MEDIA FOR MONITORING OBJECTS IN A CART USING SENSORS

(71) Applicant: Walmart Apollo, LLC, Bentonville, AR (US)

(72) Inventors: Matthew Allen Jones, Bentonville, AR (US); Aaron James Vasgaard, Fayetteville, AR (US); Nicholaus Adam Jones, Fayetteville, AR (US); Robert James Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 499 days.

(21) Appl. No.: 15/785,835

(22) Filed: Oct. 17, 2017

(65) Prior Publication Data
US 2018/0108072 A1 Apr. 19, 2018

Related U.S. Application Data

(60) Provisional application No. 62/409,443, filed on Oct. 18, 2016.

(51) Int. Cl.
G06Q 30/06 (2023.01)
G06Q 20/32 (2012.01)
(Continued)

(52) U.S. Cl.
CPC ..... *G06Q 30/0633* (2013.01); *G06Q 20/3224* (2013.01); *G06Q 30/0625* (2013.01); *G07G 1/0081* (2013.01)

(58) Field of Classification Search
CPC .......................... G06Q 30/06; G06Q 30/0633
(Continued)

(56) References Cited

U.S. PATENT DOCUMENTS

| 6,435,407 | B1 | 8/2002 | Fiordelisi et al. |
| 7,339,469 | B2 | 3/2008 | Braun |
| (Continued) | | | |

FOREIGN PATENT DOCUMENTS

| WO | 2016018895 A1 | 2/2016 |
| WO | 2016135142 A1 | 9/2016 |

OTHER PUBLICATIONS

Abbott, Judith A. "Quality measurement of fruits and vegetables". Postharvest Biology and Technology. (Mar. 10, 1999). https://www.sciencedirect.com/science/article/pii/S0925521498000866.*

(Continued)

*Primary Examiner* — Jeffrey A. Smith
*Assistant Examiner* — Jennifer V Lee
(74) *Attorney, Agent, or Firm* — Fitch, Even, Tabin & Flannery, LLP

(57) ABSTRACT

A technique for monitoring objects in a cart is disclosed. A cart is configured to receive an object and includes a plurality of sensors configured to detect a location of the cart and a characteristic of an object in the cart. The cart also includes a docking station that can receive an electronic device and operatively and electrically couple the sensors to the electronic device. A computing system is in communication with the electronic device and configured to access a database containing a stored list generated by the user. The computing can identify the object in the cart based, at least in part, on data received from the plurality of sensors and the location of the cart. The computing system can also determine whether the object in the cart is included on the stored list.

20 Claims, 7 Drawing Sheets

(51) Int. Cl.
*G06Q 30/0601* (2023.01)
*G07G 1/00* (2006.01)

(58) Field of Classification Search
USPC .............................................. 705/26.1–27.2
See application file for complete search history.

(56) References Cited

U.S. PATENT DOCUMENTS

| | | | |
|---|---|---|---|
| 7,672,876 | B2 | 3/2010 | Bonner et al. |
| 7,934,647 | B1* | 5/2011 | Mims ................ B62B 5/0096 235/383 |
| 8,955,870 | B2 | 2/2015 | Lee et al. |
| 9,243,918 | B2 | 1/2016 | Goldman et al. |
| 2009/0017764 | A1 | 1/2009 | Bonner et al. |
| 2010/0057345 | A1 | 3/2010 | Baldi et al. |
| 2012/0214515 | A1* | 8/2012 | Davis ................ G10L 19/018 455/456.3 |
| 2013/0103539 | A1* | 4/2013 | Abraham ........... G06Q 30/0633 705/26.8 |
| 2013/0261964 | A1* | 10/2013 | Goldman ............. G05D 1/0259 701/500 |
| 2014/0207570 | A1 | 7/2014 | Cancro et al. |
| 2014/0236653 | A1 | 8/2014 | Farrell |
| 2014/0244207 | A1 | 8/2014 | Hicks |
| 2017/0186073 | A1* | 6/2017 | Bryan ...................... G06F 3/14 |

OTHER PUBLICATIONS

Ng, Yen Leng, et al., Automatic Human Guided Shopping Trolley with Smart Shopping System, UTM Jurnal Teknologi, University Teknologi Malaysia, vol. 73, No. 3, 2012.

International Search Report and Written Opinion from related International Patent Application No. PCT/US2017/056999 issued Jan. 9, 2018.

* cited by examiner

SYSTEM, METHOD, AND MACHINE-READABLE MEDIA FOR MONITORING OBJECTS IN A CART USING SENSORS

CROSS-REFERENCE TO RELATED PATENT APPLICATIONS

This application claims priority to U.S. Provisional Application No. 62/409,443 filed on Oct. 18, 2016, the content of which is hereby incorporated by reference in its entire

BACKGROUND

Processes for tracking objects being placed in and/or removed from carts can be prone to errors and inaccuracies. In addition, these processes are susceptible to fraudulent and/or abusive activities.

SUMMARY

Embodiments of the present disclosure utilize sensors and a docking station associated with a cart in order to monitor objects in the cart. In some embodiments, cart sensors can determine the presence and identity of objects placed within the cart, and a computing system can cross reference the objects placed in the cart against a stored list of objects.

In one embodiment, a system for monitoring objects in a cart is disclosed. The system includes a cart configured to receive an object, and sensors associated with the cart and configured to detect a geographical location of the cart and a characteristic of the object in the cart. The system also includes a docking station on the cart including electrical circuitry that operatively and electrically couples the sensors to an electronic device associated with a user in response to receipt of the electronic device by the docking station. The system also includes a computing system disposed remotely from the electronic device and configured to be in communication with the electronic device. The computing system is configured to access a database containing a stored list generated by the user, wherein each object on the stored list has an expected geographical location. The computing system is also configured to identify the object in the cart based, at least in part, on data received from the sensors, and the geographical location of the cart. The computing system is also configured to determine whether the object is included on the stored list based on an identity of the object.

In another embodiment, a method for monitoring objects in a cart is disclosed. The method includes detecting a geographical location of the cart using sensors associated with the cart. The method also includes detecting a characteristic of an object in the cart using the sensors, and operatively and electrically coupling the sensors to an electronic device associated with a user in response to receipt of the electronic device by a docking station on the cart. The method also includes accessing a database containing a stored list using a computing system disposed remotely from the electronic device and in communication with the electronic device. Each object on the stored list has an expected geographical location associated with that object. The method also includes identifying the object in the cart based, at least in part, on data received from the sensors, and the geographical location of the cart. The method also includes determining whether the object is included on the stored list based on an identity of the object.

Additional combinations and/or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1:
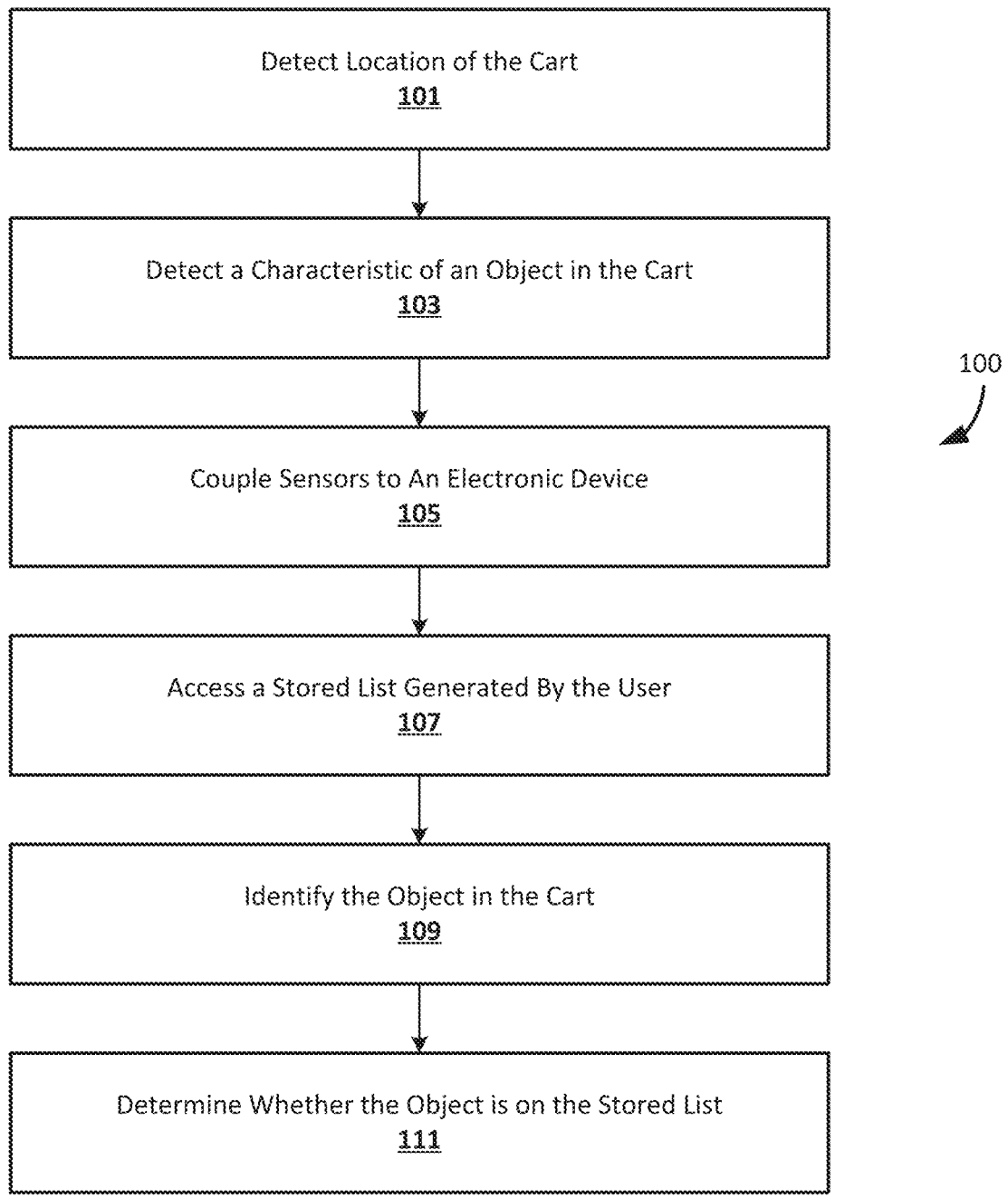
FIG. 1 is a flowchart illustrating an exemplary method for monitoring objects in a cart, according to an embodiment of the present disclosure.

Following below are more detailed descriptions of various concepts related to, and embodiments of, inventive methods, devices, and systems for monitoring objects in a cart. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means "includes but is not limited to", the term "including" means "including but not limited to". The term "based on" means "based at least in part on".

In accordance with some embodiments of the present disclosure, methodologies, systems, apparatus, and non-transitory computer-readable media are described herein to facilitate monitoring objects in a cart. In exemplary embodiments, a cart contains a number of sensors that are configured to monitor, for example, the presence of objects within the cart and the geographical location of the cart. The sensors can also monitor one or more characteristics of objects within the cart. In some embodiments, the sensors can include weight sensors, temperature sensors, humidity sensors, optical sensors, cameras, RFID readers, moisture sensors, pressure sensors, gas sensors, infrared beam-break sensors, or any other sensors suitable for monitoring the presence and/or characteristics of an object placed in the cart. The cart can also include a docking station that can receive an electronic device associated with a user. Once the electronic device is received by the docking station, the sensors are operatively and electrically coupled to the electronic device through the docking station. A computing system disposed remotely from the electronic device can be in communication with the electronic device and can access a database containing a stored list. In some embodiments the stored list can be generated by the user. The stored list can include, for example, a list of objects that the user intends to retrieve and place in the cart. In one example embodiment, the computing system can access a database including an expected geographical location associated with each object on the stored list. In one embodiment, the computing system can identify the object in the cart based, at least in part, on data received from the sensors and/or the geographical location of the cart. Once the object in the cart is identified, the computing system determines whether the object in the cart is included on the stored list.

In one example embodiment, the computing system can transmit a command to the electronic device to generate a notification if the cart has passed an object on the stored list without that object being placed in the cart. In another embodiment, the computing system can transmit a command to the electronic device to generate a notification if the object placed in the cart is not on the stored list. Alternatively or additionally, the computing system can transmit a command to the electronic device to provide navigation instructions for navigating to the expected location of an object on the stored list. In some embodiments, the navigation instructions can include a visual or audio output that is provided to the user via a GUI of the electronic device.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating a method 100 for monitoring objects in a cart, in accordance with an exemplary embodiment. It will be appreciated that the method is programmatically performed by one or more computer-executable processes executing on, or in communication with, one or more computing systems or servers described further below. In step 101, geographical location sensors associated with a cart are used to detect a geographical location of the cart. In some embodiments, one or more of the location sensors associated with the cart can be in communication with a computing system that can determine the location of the cart using, for example, mobile device tracking technology, radio frequency technology, or a global positioning system.

In step 103, the sensors detect a characteristic of an object in the cart. In some embodiments, the sensors can include one or more of the following sensors that are configured to detect the presence or characteristics of an object: weight sensors, temperature sensors, humidity sensors, optical sensors, cameras, RFID readers, moisture sensors, pressure sensors, gas sensors, infrared beam-break sensors, etc.

In step 105, the plurality of sensors are operatively and electrically coupled to an electronic device associated with a user in response to a docking station on the cart receiving the electronic device. In some embodiments, the docking station can include electrical circuitry, such as an electrical connector or computer bus, that is configured to receive the electronic device.

In step 107, a computing system disposed remotely from the electronic device accesses a database containing a stored list, e.g., generated by the user. The stored list can include, for example, a list of objects that the user intends to retrieve and place in the cart. The computing system is in communication with the electronic device, and each object on the stored list can have an expected geographical location associated with that object. In one example embodiment, the computing system can access a database including the expected geographical locations associated with each object on the stored list. In some embodiments, the computing system is in communication with the electronic device using, for example, a wireless communication network, and the computing system can be in communication with the cart sensors via the electronic device and the docking station. In some embodiments, a user can scan a machine readable feature associated with the object, using a portable electronic device such as a smartphone, before placing it in the cart. In such an example, the stored list can be generated dynamically on the user's portable electronic device by scanning the object prior to placing it in the cart. In other embodiments, a user can collect various items for another individual and place them within the cart.

In step 109, the computing system executes an object identification module configured to identify the object in the cart based, at least in part, on data received from the sensors and/or the geographical location of the cart. For example, the sensors may include a scanner configured to read a barcode or other machine-readable feature, and the sensor can read a machine-readable feature associated with the object placed in the cart. The machine-readable feature may include identification information that allows the computing system to identify the object in the cart. In some embodiments, the sensors may include an RFID reader configured to read an RFID tag associated with the object placed in the cart. In other embodiments, the sensors can include a weight sensor, and the computing system can identify the object placed in the cart based on the object's weight.

In some embodiments, if the object does not include an RFID tag, barcode, or other machine-readable feature, or if the RFID tag, barcode, or machine-readable feature is unreadable by the scanner, the other sensors can identify the object based on various physical attributes of the object. For example, a beam break sensor can measure the dimensions of the object within the cart and use these dimensions to help identify the object. In other embodiments, weight or weight distribution sensors can be used to identify the object by measuring particular weight characteristics of the object. The cart sensors can include, for example, moisture sensors for measuring if the object is fresh, gas sensors to identify an object based on a gas that it produces (ethylene for bananas), or temperature sensors to identify if the object is frozen, cooled, at ambient temperature, or hot.

In one example embodiment, the cart sensors can include a barcode reader and a weight sensor, and the two sensors can be used to verify the identity of an object placed in the cart. In such an example, the barcode reader can read a barcode associated with the object placed in the cart, and the weight sensor can measure the weight of the object. Such a system can help prevent errors, inaccuracies, fraud or shoplifting by verifying that the weight of an object corresponds to the barcode used to label the object.

In step 111, the computing system determines whether the object in the cart is included on the stored list generated by the user. The computing system can execute a stored list comparison module that compares the identity of the object, computed in step 109, against the stored list generated by the user.

Figure 2:
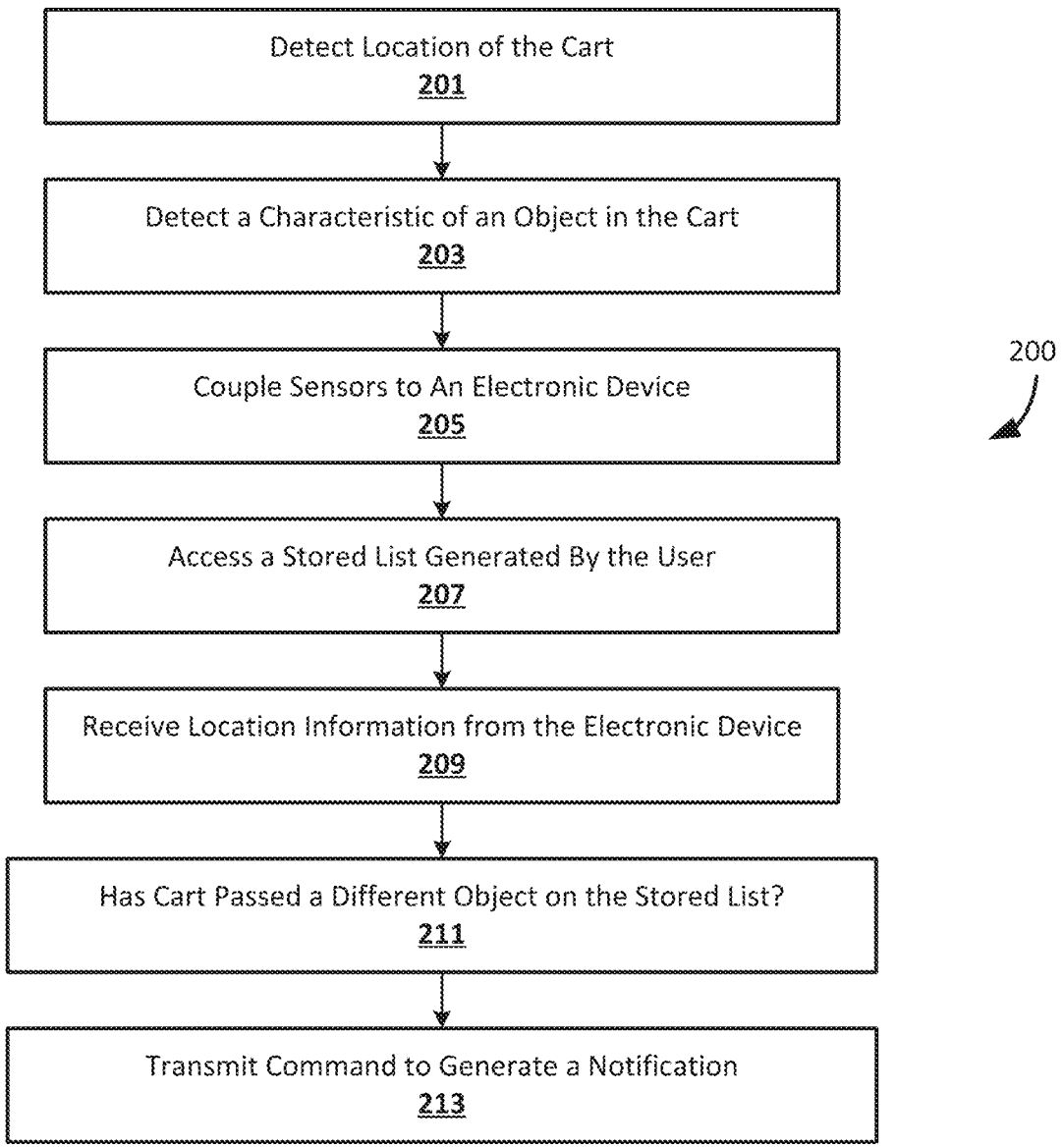
FIG. 2 is a flowchart illustrating another exemplary method for monitoring objects in a cart, according to an embodiment of the present disclosure.

FIG. 2 is a flowchart illustrating a method 200 for monitoring objects in a cart, in accordance with an exemplary embodiment. It will be appreciated that the method is programmatically performed by one or more computer-executable processes executing on, or in communication with, one or more computing systems or servers described further below. In step 201, a number of geographical location sensors associated with a cart detect a location of the cart. The location sensors can be in communication with a computing system, in some embodiments, and can determine the location of the cart using, for example, mobile device tracking technology, radio frequency technology, or a global positioning system.

In step 203, the cart sensors detect a characteristic of an object in the cart. In some embodiments, the sensors can include weight sensors, temperature sensors, humidity sensors, optical sensors, cameras, RFID readers, moisture sensors, pressure sensors, gas sensors, infrared beam-break sensors, or any other sensors suitable for detecting the presence and/or characteristics of an object placed in the cart.

In step 205, the cart sensors are operatively and electrically coupled to an electronic device associated with a user in response to a docking station on the cart receiving the electronic device. In some embodiments, the docking station can include electrical circuitry, such as an electrical connector or computer bus, that is configured to receive the electronic device. The electronic device can also receive power through the docking station, in some embodiments.

In step 207, a computing system disposed remotely from the electronic device accesses a database containing a stored list generated by the user. In some embodiments, the stored list includes a list of objects that the user intends to retrieve and place in the cart. The computing system is in communication with the electronic device, and each object on the stored list can have an expected geographical location associated with that object. In one example embodiment, the computing system can access a database including the expected geographical locations associated with each object on the stored list. In some embodiments, the computing system is in communication with the electronic device using, for example, a wireless communication network, and the computing system can receive data from the cart sensors via the electronic device and the docking station.

In step 209, the computing system receives location information from the electronic device. In some embodiments, the electronic device can be Wi-Fi enabled or can include inertial sensors, barometric pressure sensors, near-field communication sensors, or other location tracking technologies. The computing system can receive this location information from the electronic device in order to determine the location of the cart, in some embodiments.

In step 211, the computing system determines that the cart has passed an object on the stored list without that object being placed in the cart. This determination can be based on the location of the cart and the expected geographical location of the objects on the stored list. As discussed above, each object on the stored list is associated with an expected geographical location, and the computing system can determine whether the cart has passed the expected geographical location of an object without that object being placed in the cart.

In step 213, the computing system executes a notification module to transmit a command to the electronic device to generate a notification that the cart has passed the expected geographical location of an object without that object being placed in the cart. Such a notification can be presented to the user via a GUI associated with the electronic device, in some embodiments.

Figure 3:
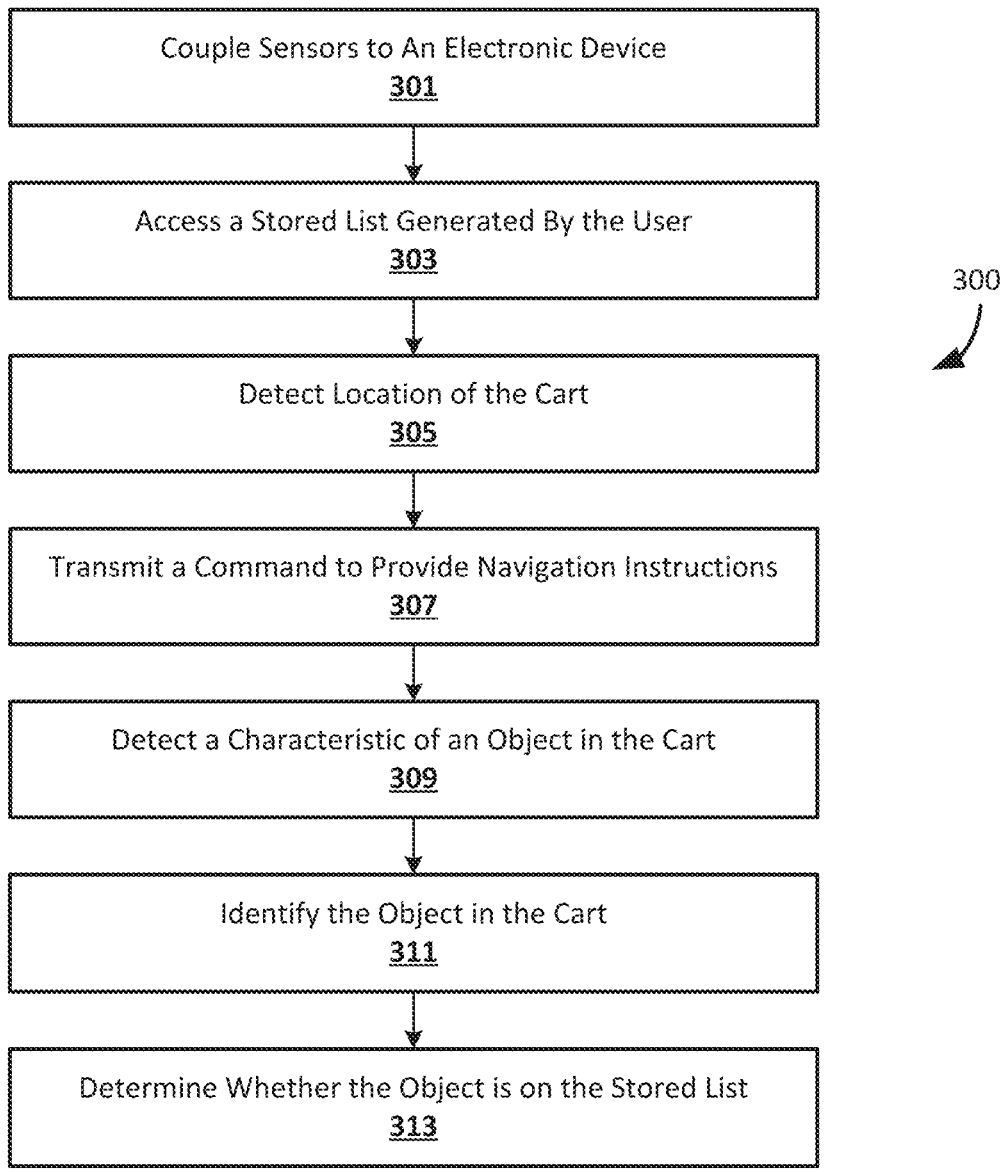
FIG. 3 is a flowchart illustrating another exemplary method for monitoring objects in a cart, according to an embodiment of the present disclosure.

FIG. 3 is a flowchart illustrating a method 300 for monitoring objects in a cart, in accordance with an exemplary embodiment. It will be appreciated that the method is programmatically performed by one or more computer-executable processes executing on, or in communication with, one or more computing systems or servers described further below. In step 301, a plurality of cart sensors are operatively and electrically coupled to an electronic device associated with a user in response to a docking station on the cart receiving the electronic device. In some embodiments, the docking station can include electrical circuitry, such as an electrical connector or computer bus, that is configured to receive the electronic device. The electronic device can also receive power through the docking station, in some embodiments.

In step 303, a computing system disposed remotely from the electronic device accesses a database containing a stored list generated by the user. In some embodiments, the stored list includes a list of objects that the user intends to retrieve and place in the cart. The computing system is in communication with the electronic device, and each object on the stored list can have an expected geographical location associated with that object. In one example embodiment, the computing system can access a database including the expected geographical locations associated with each object on the stored list. In some embodiments, the computing system is in communication with the electronic device using, for example, a wireless communication network, and the computing system can receive data from the cart sensors via the electronic device and the docking station.

In step 305, the cart sensors detect a geographical location of the cart. The cart sensors can be in communication with a computing system, in some embodiments, and can determine the location of the cart using, for example, mobile device tracking technology, radio frequency technology, or a global positioning system.

In step 307, the computing system executes a navigation module that is configured to transmit a command from the computing system to the electronic device to provide navigation instructions for navigating to an object on the stored list. In some embodiments, the navigation instructions can include a visual or audio output that is provided to the user via a GUI of the electronic device.

In step 309, the cart sensors detect a characteristic of an object in the cart. In some embodiments, the sensors can include weight sensors, temperature sensors, humidity sensors, optical sensors, cameras, RFID readers, moisture sensors, pressure sensors, gas sensors, infrared beam-break sensors, or any other sensors suitable for detecting the presence and/or characteristics of an object placed in the cart.

In step 311, the computing system executes an object identification module configured to identify the object in the cart based, at least in part, on data received from the sensors and/or the geographical location of the cart. For example, the sensors may include a scanner configured to read a barcode or other machine-readable feature associated with the object. The machine-readable feature may include identification information that allows the computing system to identify the object in the cart. In some embodiments, the sensors may include an RFID reader configured to read an RFID tag associated with the object placed in the cart. In some embodiments, if the object does not include an RFID tag, barcode, or other machine-readable feature, or if the RFID tag, barcode, or machine-readable feature is unreadable by the scanner, the other sensors can identify the object based on various physical attributes of the object.

In step 313, the computing system determines whether the object in the cart is included on the stored list generated by the user. The computing system can execute a stored list comparison module that compares the identity of the object, computed in step 311, against the stored list generated by the user.

Figure 4:
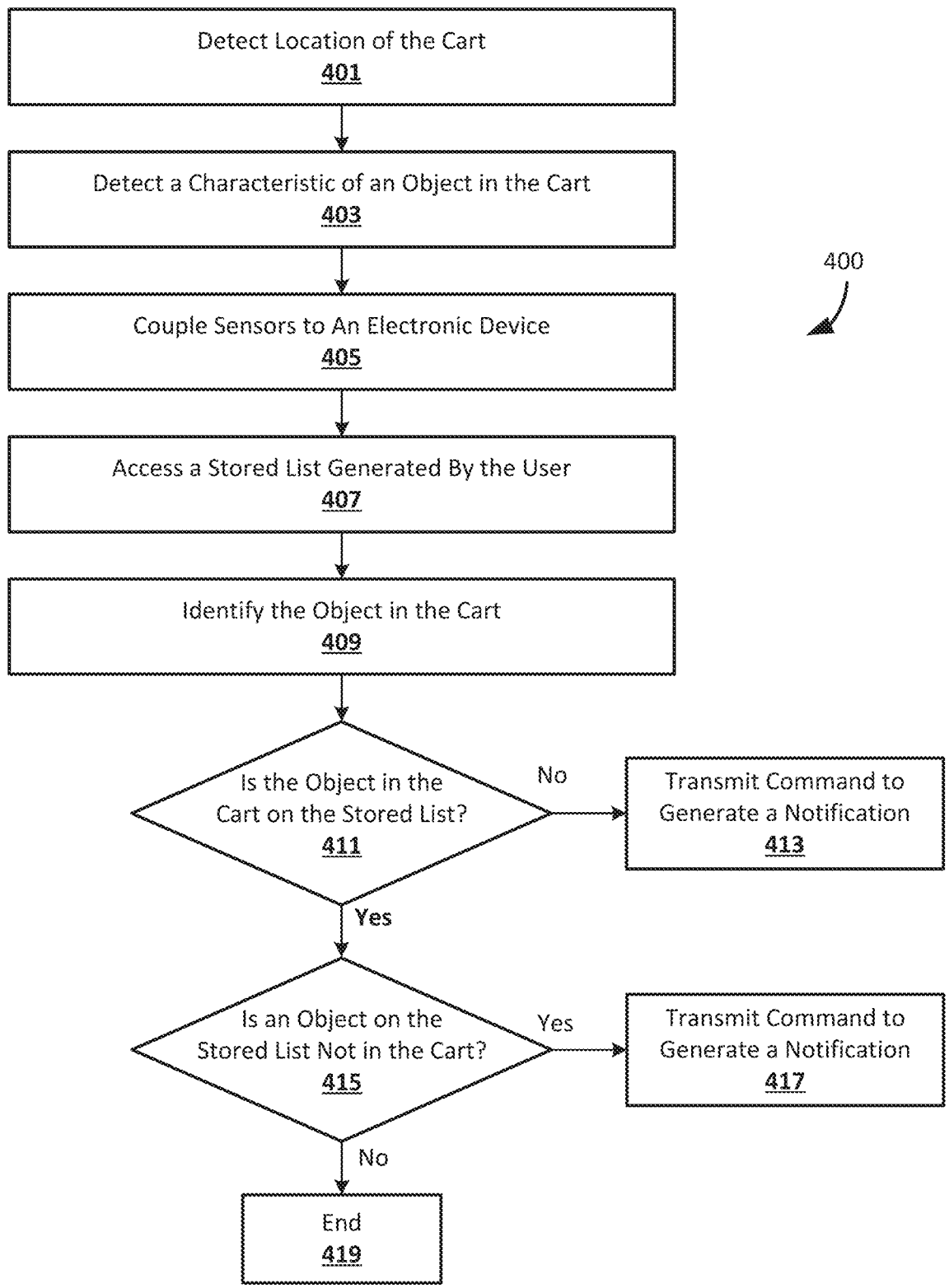
FIG. 4 is a flowchart illustrating another exemplary method for monitoring objects in a cart, according to an embodiment of the present disclosure.

FIG. 4 is a flowchart illustrating a method 400 for monitoring objects in a cart, in accordance with an exemplary embodiment. It will be appreciated that the method is programmatically performed by one or more computer-executable processes executing on, or in communication with, one or more computing systems or servers described further below. In step 401, a plurality of sensors associated with a cart are used to detect a geographical location of the cart. In some embodiments, one or more of the sensors associated with the cart can be in communication with a computing system that can determine the location of the cart using, for example, mobile device tracking technology, radio frequency technology, or a global positioning system.

In step 403, the cart sensors detect a characteristic of an object in the cart. In some embodiments, the cart sensors can include weight sensors, temperature sensors, humidity sensors, optical sensors, cameras, RFID readers, moisture sensors, pressure sensors, gas sensors, infrared beam-break sensors, or any other sensors suitable for detecting the presence and/or characteristics of an object placed in the cart.

In step 405, the plurality of sensors are operatively and electrically coupled to an electronic device associated with a user in response to a docking station on the cart receiving the electronic device. In some embodiments, the docking station can include electrical circuitry, such as an electrical connector or computer bus, that is configured to receive the electronic device.

In step 407, a computing system disposed remotely from the electronic device accesses a database containing a stored list generated by the user. The stored list can include, for example, a list of objects that the user intends to retrieve and place in the cart. The computing system is in communication with the electronic device, and each object on the stored list can have an expected geographical location associated with that object. In one example embodiment, the computing system can access a database including the expected geographical locations associated with each object on the stored list. In some embodiments, the computing system is in communication with the electronic device using, for example, a wireless communication network, and the computing system can be in communication with the cart sensors via the electronic device and the docking station.

In step 409, the computing system executes an object identification module configured to identify the object in the cart based, at least in part, on data received from the sensors and/or the geographical location of the cart. For example, the sensors may include a scanner configured to read a barcode or other machine-readable feature, and the sensor can read a machine-readable feature associated with the object placed in the cart. The machine-readable feature may include identification information that allows the computing system to identify the object in the cart. In some embodiments, the sensors may include an RFID reader configured to read an RFID tag associated with the object placed in the cart. In other embodiments, the sensors can include a weight sensor, and the computing system can identify the object placed in the cart based on the object's weight. In some embodiments, if the object does not include an RFID tag, barcode, or other machine-readable feature, or if the RFID tag, barcode, or machine-readable feature is unreadable by the scanner, the other sensors can identify the object based on various physical attributes of the object.

In step 411, the computing system determines whether the object in the cart is included on the stored list, e.g., generated by the user. The computing system can execute a stored list comparison module that compares the identity of the object computed in step 409 against the stored list generated by the user. If the object in the cart is not on the stored list, the computing system executes a notification module in step 413 to transmit a command to the electronic device from the computing system to generate a notification that the object in the cart is not on the stored list. Such a notification can be presented to the user via a GUI of the electronic device, in some embodiments.

If the object in the cart is on the stored list, the method 400 proceeds to step 415, in which the computing system determines whether a different object on the stored list is not disposed within the cart. If all the objects on the stored list are disposed in the cart, the method ends at step 419. If, however, an object on the stored list is not disposed in the cart, the computing system executes the notification module to transmit a command to the electronic device to generate a notification that an object on the stored list is not in the cart. Such a notification can be presented to the user via a GUI of the electronic device, in some embodiments.

Figure 5:
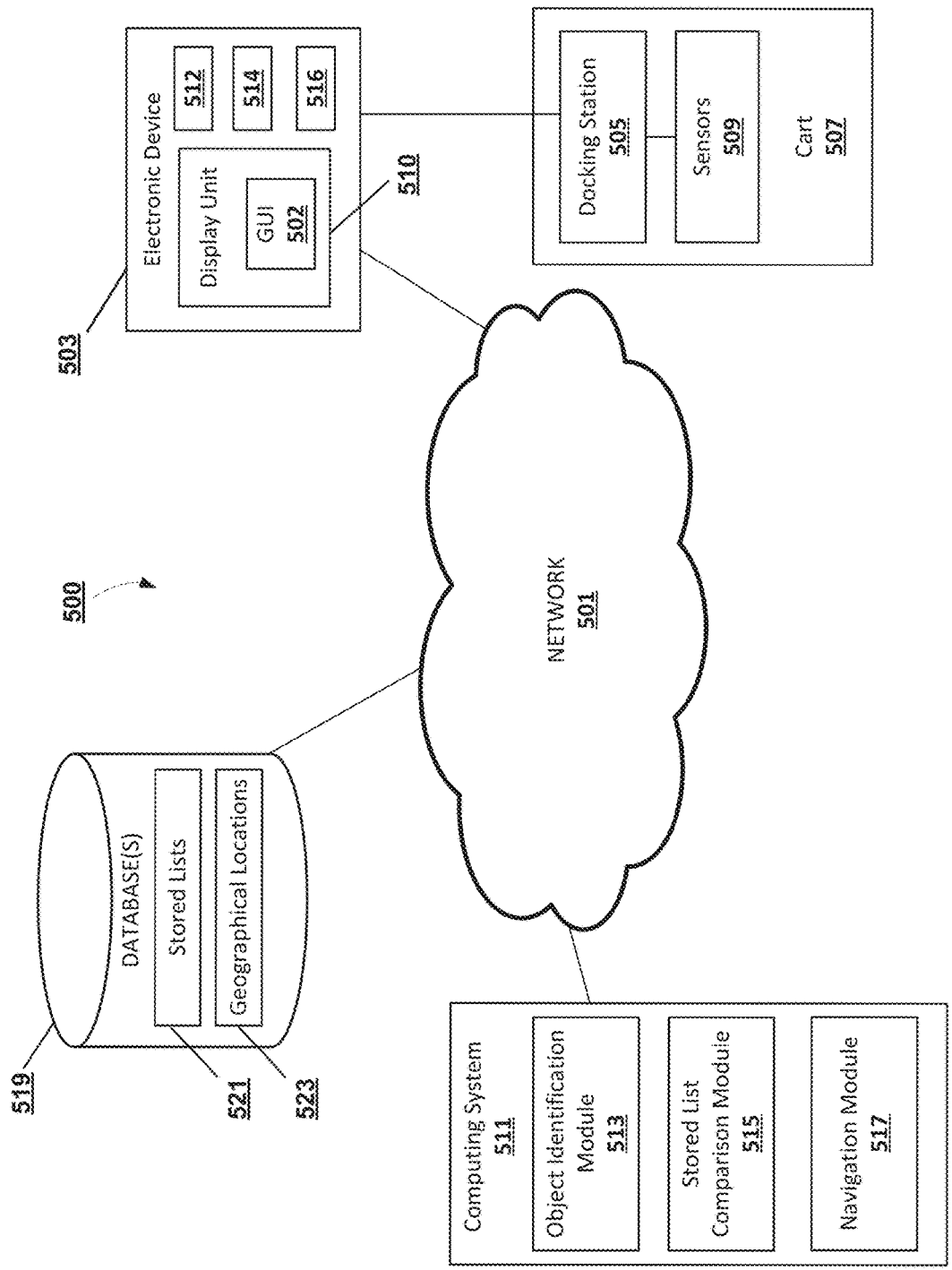
FIG. 5 is a diagram of an exemplary network environment suitable for a distributed implementation of an exemplary embodiment of the present disclosure.

FIG. 5 illustrates a network diagram depicting a system 500 suitable for a distributed implementation of exemplary embodiments. The system 500 can include a network 501, electronic device 503, docking station 505, cart 507, sensors 509, computing system 511, and a database 519. As will be appreciated, various distributed or centralized configurations may be implemented. In exemplary embodiments, computing system 511 can store an object identification module 513, a stored list comparison module 515, and a navigation module 517, each of which can implement one or more of the processes described herein with reference to FIGS. 1-4, or portions thereof. It will be appreciated that the module functionality may be implemented as a greater or lesser number of modules than illustrated, and that the same computing system or server could host one or more modules. The database 519 can store the stored lists 521 and the geographical locations 523 associated with objects on the stored lists, in exemplary embodiments.

In exemplary embodiments, the electronic device 503 may include a display unit 510, which can display a GUI 502 to a user of the electronic device. In some embodiments, the GUI 502 can provide navigation instructions, as discussed above in reference to FIG. 3. The electronic device can also include a memory 512, processor 514, and a wireless interface 516. In some embodiments, the electronic device 503 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like equipped with, or in communication with, a display surface. The electronic device 503 may include some or all components described in relation to computing device 600 shown in FIG. 6.

The electronic device 503 may connect to the network 501 via a wired or wireless connection. The electronic device 503 may include one or more applications such as, but not limited to, a web browser, a transaction application, an object reader application, and the like.

In exemplary embodiments, the electronic device 503, is operatively and electrically coupled to a number of sensors 509 via a docking station 505 on a cart 507. The docking station 505 is configured to receive the electronic device 503. The electronic device 503, computing system 511, and database 519 may be in communication with each other via the communication network 501. The communication network 501 may include, but is not limited to, the Internet, an intranet, a LAN (Local Area Network), a WAN (Wide Area Network), a MAN (Metropolitan Area Network), a wireless network, an optical network, and the like. In one embodiment, the electronic device 503 and computing system 511 can transmit instructions to each other over the communication network 501. In exemplary embodiments, the stored lists 521 and geographical locations 523 associated with objects on the stored lists 521 can be stored at the database 519 and received at the electronic device 503 or computing system 511 in response to a service performed by a database retrieval application.

Figure 6:
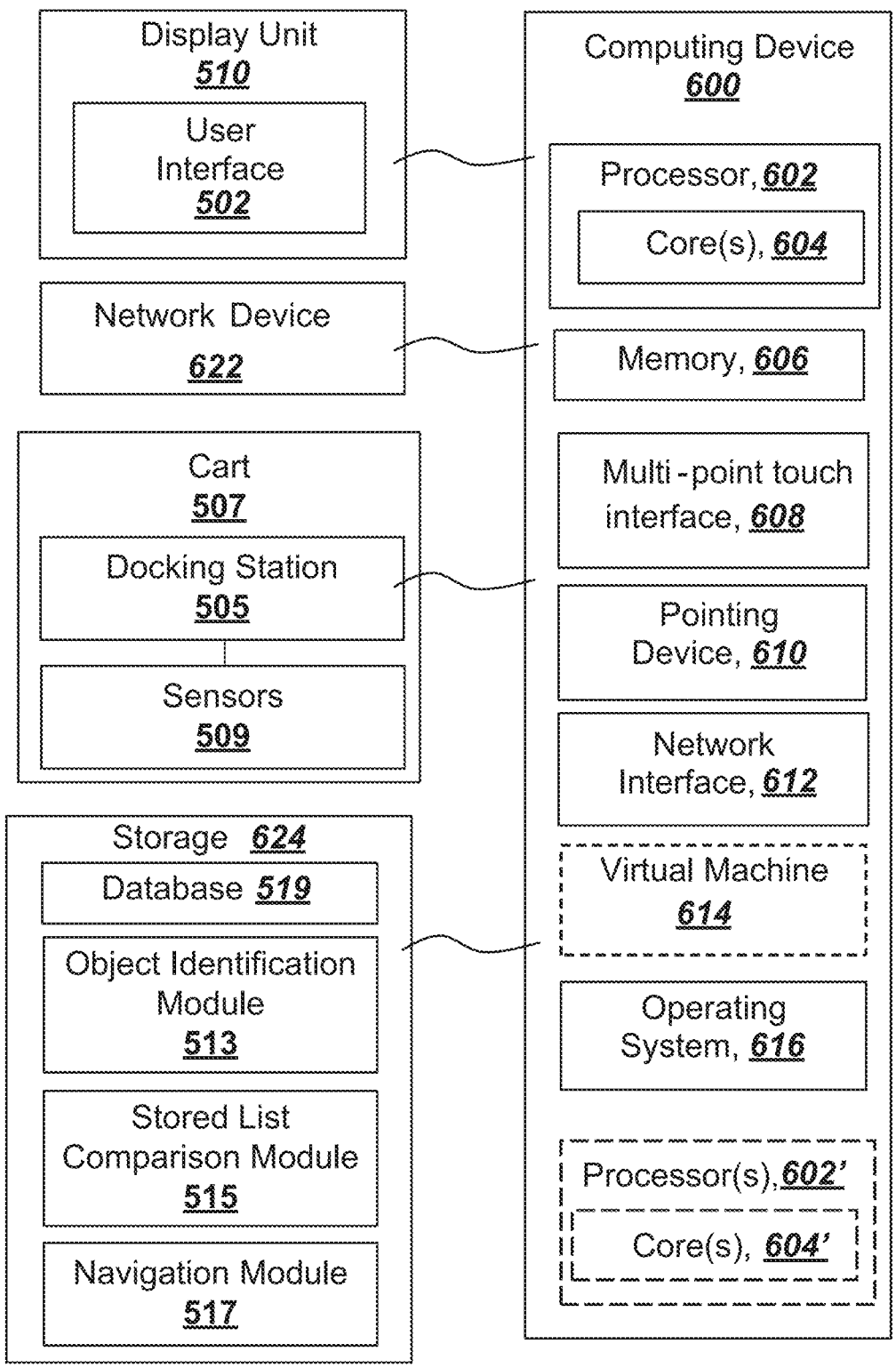
FIG. 6 is a block diagram of an exemplary computing device that can be used to perform exemplary processes in accordance with an exemplary embodiment of the present disclosure.

FIG. 6 is a block diagram of an exemplary computing device 600 that can be used in the performance of any of the example methods according to the principles described herein. The computing device 600 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 606 included in the computing device 600 can store computer-readable and computer-executable instructions or software for implementing exemplary embodiments and programmed to perform processes described above in reference to FIGS. 1-4. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can be non-transitory computer-readable media including a computer system memory or random access memory, such as DRAM, SRAM, EDO RAM, and the like. Memory 606 can include other types of memory as well, or combinations thereof.

A user can interact with the computing device 600 through a display unit 510, such as a touch screen display or computer monitor, which can display one or more user interfaces 502 that can be provided in accordance with exemplary embodiments. The computing device 600 can also include other I/O devices for receiving input from a user, for example, a keyboard or any suitable multi-point touch interface 608, a pointing device 610 (e.g., a pen, stylus, mouse, or trackpad). The multi-point touch interface 608 and the pointing device 610 can be coupled to the display unit 510. The computing device 600 can include other suitable conventional I/O peripherals.

The computing device 600 can also include one or more storage devices 624, such as a hard-drive, CD-ROM, or other non-transitory computer readable media, for storing data and computer-readable instructions and/or software, such as an object identification module 513, a stored list comparison module 515, and a navigation module 517 that can implement exemplary embodiments of the methods and systems as taught herein, or portions thereof. Exemplary storage device 624 can also store one or more databases 519 for storing any suitable information required to implement exemplary embodiments. The databases 519 can be updated by a user or automatically at any suitable time to add, delete, or update one or more items in the databases. Exemplary storage device 624 can store one or more databases 519 for storing the stored lists 521, geographical locations 523, and any other data/information used to implement exemplary embodiments of the systems and methods described herein. The computing device 600 can also be operatively and electrically coupled to a number of sensors 509 via a docking station 505 on a cart 507. The docking station 505 can include electrical circuitry configured to receive the electronic device, such as an electrical connector or computer bus, in some embodiments.

The computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616 can be run in native mode or emulated mode. In an exemplary embodiment, the operating system 616 can be run on one or more cloud machine instances.

Figure 7:
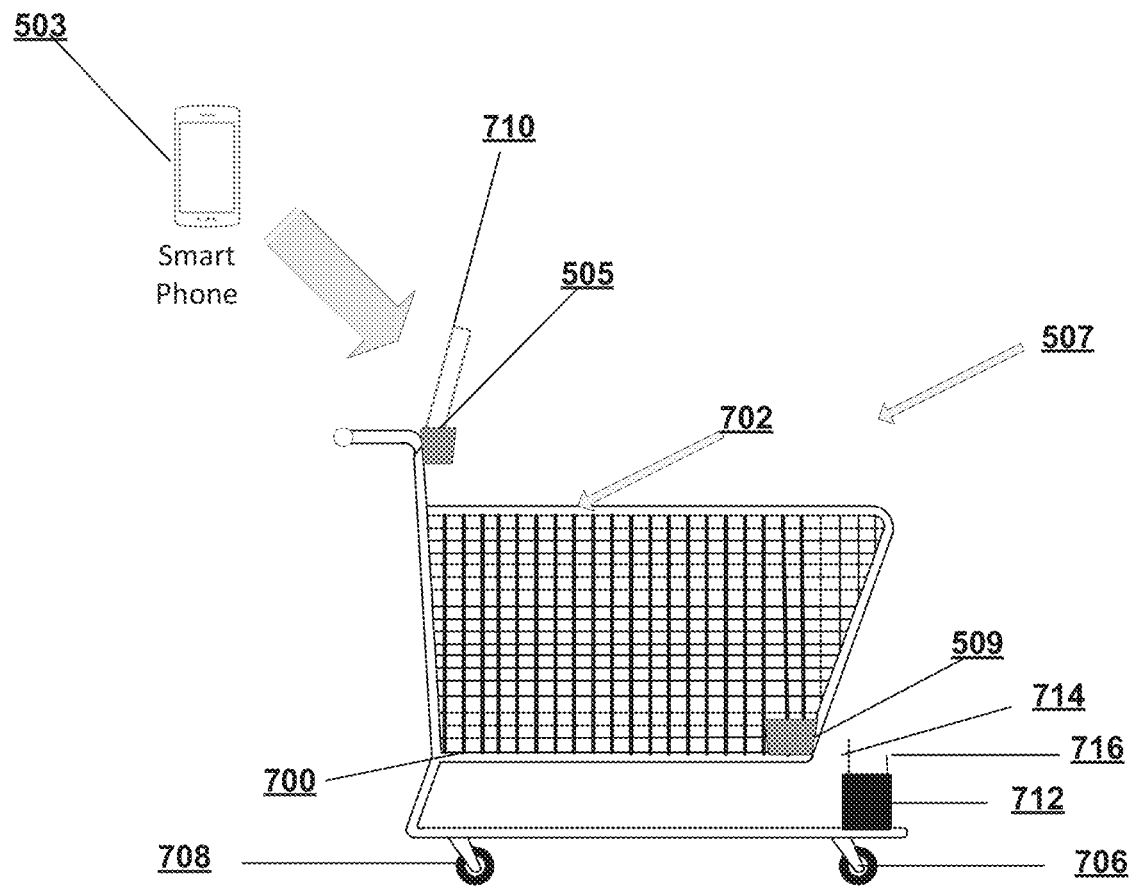
FIG. 7 is a schematic diagram of a cart according to the present disclosure.

FIG. 7 is a schematic diagram of a cart according to the present disclosure. The cart 507 can include frame 700, a basket 702 supported by the frame 700, front casters 706 supporting the frame 700, and rear casters 708 supporting the frame. An electric circuit can be distributed throughout the cart 507, and can include, a display screen 710, a docking station 505, sensors 509, a controller 712, wireless transmitter 714, and a wireless receiver 716.

The controller 712 can be configured to control display screen 710, a docking station 505, sensors 509, wireless transmitter 714, and a wireless receiver 716. The docking station 505 can include electrical circuitry configured to receive the electronic device, such as an electrical connector or computer bus. The display 710 can be an flat panel display device (e.g., using LED, OLED or LCD technology). The sensors 509 can include weight sensors, temperature sensors, humidity sensors, optical sensors, cameras, RFID readers, moisture sensors, pressure sensors, gas sensors, infrared beam-break sensors, or any other sensors suitable for detecting the presence and/or characteristics of an object placed in the cart.

The basket 702 of the cart 507 can receive multiple objects. As an example, sensors 509 detect the placement of an object into the basket 702 of the cart 507. The sensors 507 can detect a characteristic of an object in the basket 702 of the shopping cart. The sensors 509 are operatively and electrically coupled to an electronic device 503 associated with a user in response to a docking station 505 on the cart receiving the electronic device 503. The wireless transmitter 714 can be coupled with the controller 712 to transmit data to a computing system 511 and/or the electronic device 503 and a wireless receiver 716 can be coupled with the controller 712 to receive data.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A system for monitoring objects in carts operated by users, the system comprising:
   a cart of a user configured to receive an object, wherein the cart contains a plurality of sensors;
   the plurality of sensors configured to detect a geographical location of the cart of the user, scan a scannable identifier of the object in the cart, and measure a measurable physical characteristic of the object in the cart of the user, wherein the measurable physical characteristic includes dimensions of the object in the cart,
   at least one sensor of the plurality of sensors configured to output to an electronic device of the user of the cart: the detected geographical location of the cart, the scannable identifier of the object in the cart, and the measurable physical characteristic of the object in the cart of the user; and
   a computing system disposed remotely from the electronic device of the user of the cart and configured to be in communication with the electronic device and to:
   access a database containing a stored list, the stored list being a list of objects that are preselected for retrieving and placing into the cart of the user, wherein each of the objects on the stored list in the database is associated with an expected geographical location;
   identify the object in the cart of the user based, at least in part, on the detected geographical location of the cart and at least one of: the scannable identifier of the object or the measurable physical characteristic of the object received from the at least one sensor of the plurality of sensors;
   determine, based on an identity of the object, whether the object in the cart of the user is included on the stored list; and
   based on a correlation of the geographical location of the cart of the user and the expected geographical location of the objects on the stored list:
   determine that the cart of the user has passed the expected geographical location of one of the objects on the stored list without the one of the objects on the stored list having been placed in the cart of the user; and
   after a determination by the computing system, that the cart of the user has passed the expected geographical location of one of the objects on the stored list without the one of the objects on the stored list having been placed in the cart of the user, transmit a command, to the electronic device of the user of the cart,
   wherein after the command is received by the electronic device of the user of the cart, the electronic device of the user of the cart generates an electronic notification within a graphical interface on a display of the electronic device of the user of the cart, the electronic notification visibly indicating to the user of the cart that the cart of the user has passed the expected geographical location of the one of the objects on the stored list without the one of the objects on the stored list being placed into the cart of the user.

2. The system of claim 1, wherein the computing system is configured to:

determine that the cart of the user passed a different object on the stored list based on the location of the cart of the user and the expected geographic location of the different object; and transmit a command to the electronic device to generate a notification after a determination by the computing system that the cart of the user passed the expected geographical location of the different object on the stored list without the different object on the stored list being placed in the cart of the user.

3. The system of claim 1, wherein the computing system is further configured to determine that an object on the stored list is not disposed in the cart of the user and to transmit a command to the electronic device to generate a notification that the object on the stored list is not disposed in the cart of the user.

4. The system of claim 1, wherein the computing system is further configured to determine that the object in the cart of the user is not on the stored list and to transmit a command to the electronic device to generate a notification that the object in the cart of the user is not on the stored list.

5. The system of claim 1, wherein the computing system is further configured to receive location information from the electronic device.

6. The system of claim 1, wherein the computing system is further configured to transmit a command to the electronic device to provide navigation instructions for navigating to the object on the stored list.

7. The system of claim 5, wherein the navigation instructions include a visual or audio output.

8. The system of claim 1, wherein the at least one sensor includes a sensor configured to monitor temperature, pressure, off-gassing, weight, or moisture.

9. A method for monitoring objects in a cart of a user, the method comprising:
  detecting, using at least one sensor of a plurality of sensors, a geographical location of the cart of the user, wherein the cart of the user contains the plurality of sensors;
  scanning, using at least one sensor of the plurality of sensors, a scannable identifier of the object in the cart;
  measuring, using at least one sensor of the plurality of sensors, a measurable physical characteristic of the object in the cart of the user, wherein the measurable physical characteristic includes dimensions of the object in the cart;
  outputting, via at least one sensor of the plurality of sensors, to an electronic device of the user of the cart: the detected geographical location of the cart, the scannable identifier of the object in the cart, and the measurable physical characteristic of the object in the cart of the user;
  accessing, by a computing system disposed remotely from the electronic device of the user of the cart and in communication with the electronic device, a database containing a stored list, the stored list being a list of objects that are preselected for retrieving and placing into the cart of the user, wherein each of the objects on the stored list in the database is associated with an expected geographical location;
  identifying, by the computing system, the object in the cart of the user based, at least in part, on the detected geographical location of the cart and at least one of: the scannable identifier of the object or the measurable physical characteristic of the object received from the at least one sensor of the plurality of sensors;
  determining, by the computing system and based on an identity of the object, whether the object in the cart of the user is included on the stored list;
  based on a correlation of the geographical location of the cart of the user and the expected geographical location of the objects on the stored list:
    determining that the cart of the user has passed the expected geographical location of one of the objects on the stored list without the one of the objects on the stored list having been placed in the cart of the user; and
    after a determination that the cart of the user has passed the expected geographical location of one of the objects on the stored list without the one of the objects on the stored list having been placed in the cart of the user, transmitting a command, to the electronic device of the user of the cart;
  wherein after the command is received by the electronic device of the user of the cart, generating by the electronic device of the user of the cart, an electronic notification within a graphical interface on a display of the electronic device of the user of the cart, the electronic notification visibly indicating to the user of the cart that the cart of the user has passed the expected geographical location of the one of the objects on the stored list without the one of the objects on the stored list being placed into the cart of the user.

10. The method of claim 9, further comprising:
  determining that the cart of the user passed a different object on the stored list based on the location of the cart of the user and the expected geographic location of the different object; and
  transmitting a command to the electronic device to generate a notification after a determination by the computing system that the cart of the user passed the expected geographical location of the different object on the stored list without the different object on the stored list being placed in the cart of the user.

11. The method of claim 9, further comprising determining that an object on the stored list is not disposed in the cart of the user and transmitting a command to the electronic device to generate a notification that the object on the stored list is not disposed in the cart of the user.

12. The method of claim 9, further comprising determining that the object in the cart of the user is not on the stored list and transmitting a command to the electronic device to generate a notification that the object in the cart of the user is not on the stored list.

13. The method of claim 9, further comprising receiving at the computing system location information from the electronic device.

14. The method of claim 9, further comprising transmitting a command from the computing system to the electronic device to provide navigation instructions for navigating to the object on the stored list.

15. The method of claim 14, wherein the navigation instructions include a visual or audio output.

16. The method of claim 9, wherein the at least one sensor includes a sensor configured to monitor temperature, pressure, off-gassing, weight, or moisture.

17. A non-transitory machine readable medium storing instructions executable by a processing device, wherein execution of the instructions causes the processing device to implement a method for monitoring objects in a cart of a user, the method comprising:

detecting, using at least one sensor of a plurality of sensors, a geographical location of the cart of the user, wherein the cart of the user contains the plurality of sensors;

scanning, using at least one sensor of the plurality of sensors, a scannable identifier of the object in the cart;

measuring, using at least one sensor of the plurality of sensors, a measurable physical characteristic of the object in the cart of the user, wherein the measurable physical characteristic includes dimensions of the object in the cart;

outputting, via at least one sensor of the plurality of sensors, to an electronic device of the user of the cart: the detected geographical location of the cart, the scannable identifier of the object in the cart, and the measurable physical characteristic of the object in the cart of the user;

accessing, by a computing system disposed remotely from the electronic device of the user of the cart and in communication with the electronic device, a database containing a stored list, the stored list being a list of objects that are preselected for retrieving and placing into the cart of the user, wherein each of the objects on the stored list in the database is associated with an expected geographical location;

identifying, by the computing system, the object in the cart of the user based, at least in part, on the detected geographical location of the cart and at least one of: the scannable identifier of the object or the measurable physical characteristic of the object received from the at least one sensor of the plurality of sensors;

determining, by the computing system and based on an identity of the object, whether the object in the cart of the user is included on the stored list;

based on a correlation of the geographical location of the cart of the user and the expected geographical location of the objects on the stored list:

determining that the cart of the user has passed the expected geographical location of one of the objects on the stored list without the one of the objects on the stored list having been placed in the cart of the user; and after a determination that the cart of the user has passed the expected geographical location of one of the objects on the stored list without the one of the objects on the stored list having been placed in the cart of the user, transmitting a command, to the electronic device of the user of the cart;

wherein after the command is received by the electronic device of the user of the cart, generating by the electronic device of the user of the cart, an electronic notification within a graphical interface on a display of the electronic device of the user of the cart, the electronic notification visibly indicating to the user of the cart that the cart of the user has passed the expected geographical location of the one of the objects on the stored list without the one of the objects on the stored list being placed into the cart of the user.

18. The non-transitory machine readable medium of claim 17, wherein execution of the instructions further causes the computing system to:

determine that the cart of the user passed a different object on the stored list based on the location of the cart of the user and the expected geographic location of the different object; and transmit a command to the electronic device to generate a notification after a determination by the computing system that the cart of the user passed the expected geographical location of the different object on the stored list without the different object on the stored list being placed in the cart of the user.

19. The non-transitory machine readable medium of claim 17, wherein execution of the instructions further causes the computing system to determine that an object on the stored list is not disposed in the cart of the user and to transmit a command to the electronic device to generate a notification that the object on the stored list is not disposed in the cart of the user.

20. The non-transitory machine readable medium of claim 17, wherein execution of the instructions further causes the computing system to determine that the object in the cart of the user is not on the stored list and to transmit a command to the electronic device to generate a notification that the object in the cart of the user is not on the stored list.

* * * * *